Figure 1:
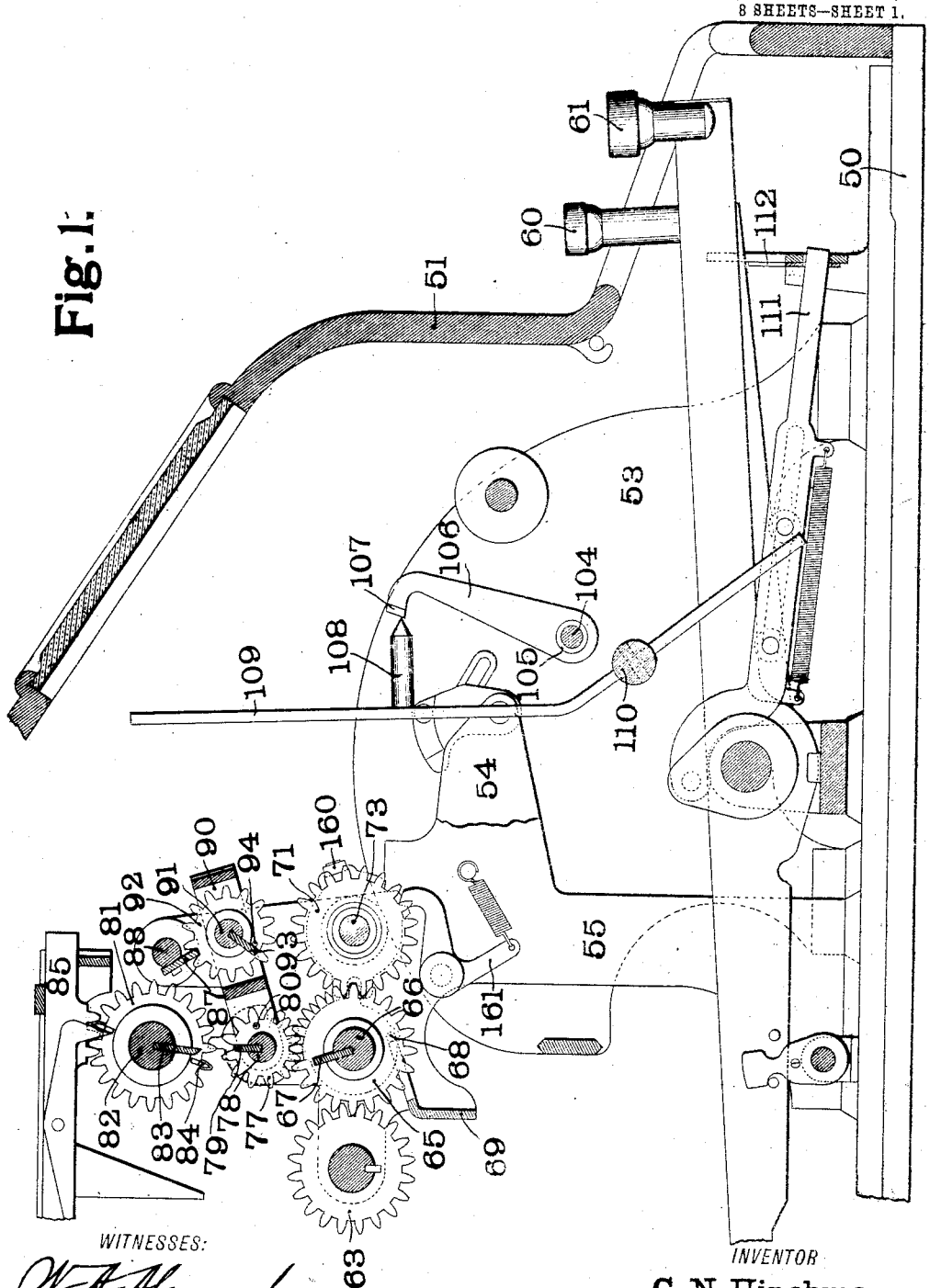

No. 833,389. PATENTED OCT. 16, 1906.
G. N. HINCHMAN.
ADDING MACHINE.
APPLICATION FILED NOV. 13, 1905.

8 SHEETS—SHEET 2.

WITNESSES:
W. H. Alexander.
Fred Henke.

INVENTOR
G. N. Hinchman.
BY
ATTORNEYS

No. 833,389. PATENTED OCT. 16, 1906.
G. N. HINCHMAN.
ADDING MACHINE.
APPLICATION FILED NOV. 13, 1905.
8 SHEETS—SHEET 3.
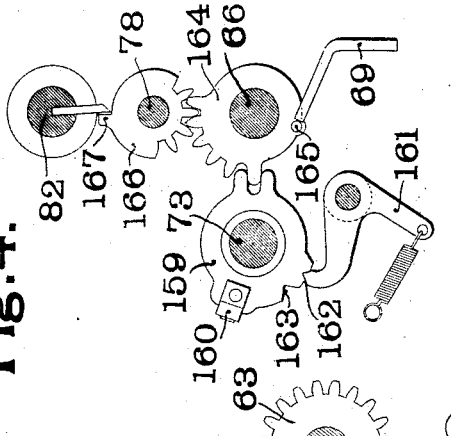
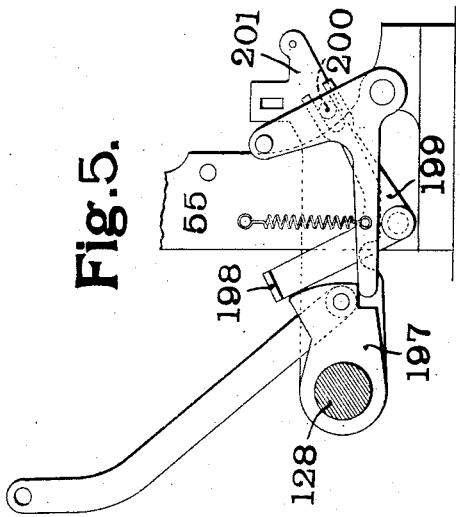
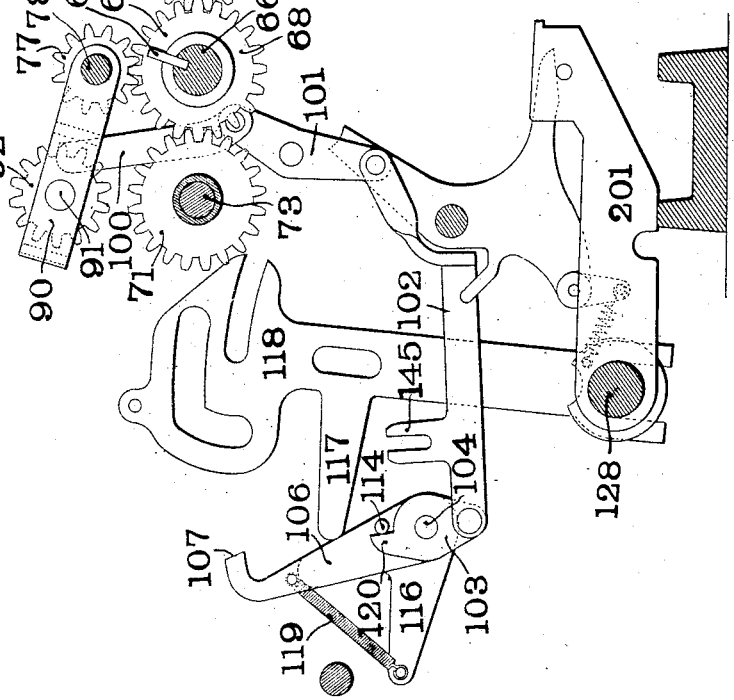
WITNESSES:
W. A. Alexander.
Fred Henke
INVENTOR
G. N. Hinchman.
BY
Fowler & Bryson
ATTORNEYS No. 833,389. PATENTED OCT. 16, 1906.
G. N. HINCHMAN.
ADDING MACHINE.
APPLICATION FILED NOV. 13, 1905.
8 SHEETS—SHEET 4.
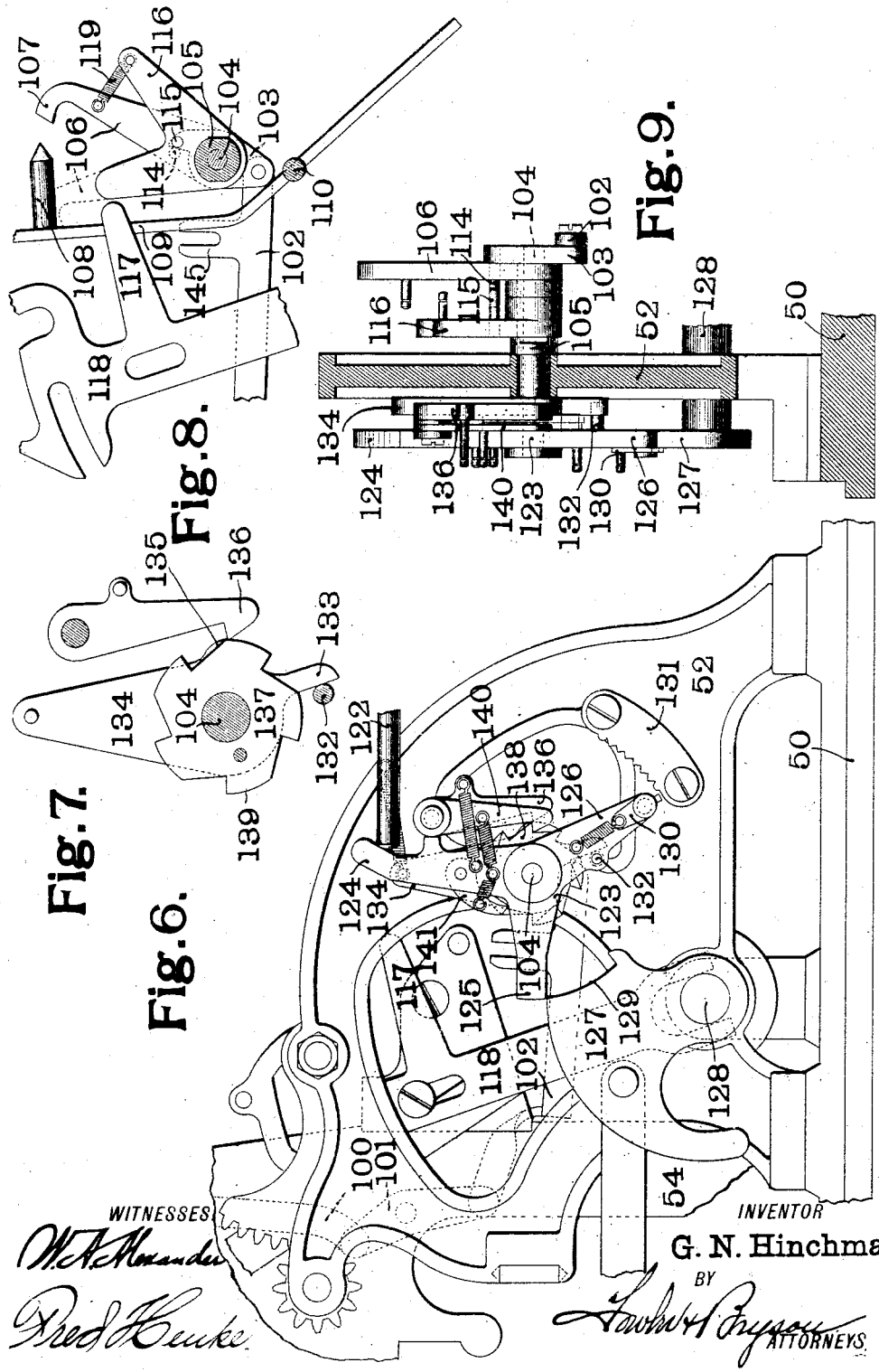
INVENTOR
G. N. Hinchman.

No. 833,389. PATENTED OCT. 16, 1906.
G. N. HINCHMAN.
ADDING MACHINE.
APPLICATION FILED NOV. 13, 1905.

8 SHEETS—SHEET 5.

WITNESSES:
Fred Henke
W. A. Alexander

INVENTOR
G. N. Hinchman.
BY
Fowler H Bryson
ATTORNEYS

No. 833,389. PATENTED OCT. 16, 1906.
G. N. HINCHMAN.
ADDING MACHINE.
APPLICATION FILED NOV. 13, 1905.

8 SHEETS—SHEET 6.

WITNESSES:
W. A. Alexander.
Fred H. Henke.

INVENTOR
G. N. Hinchman.
BY
ATTORNEYS.

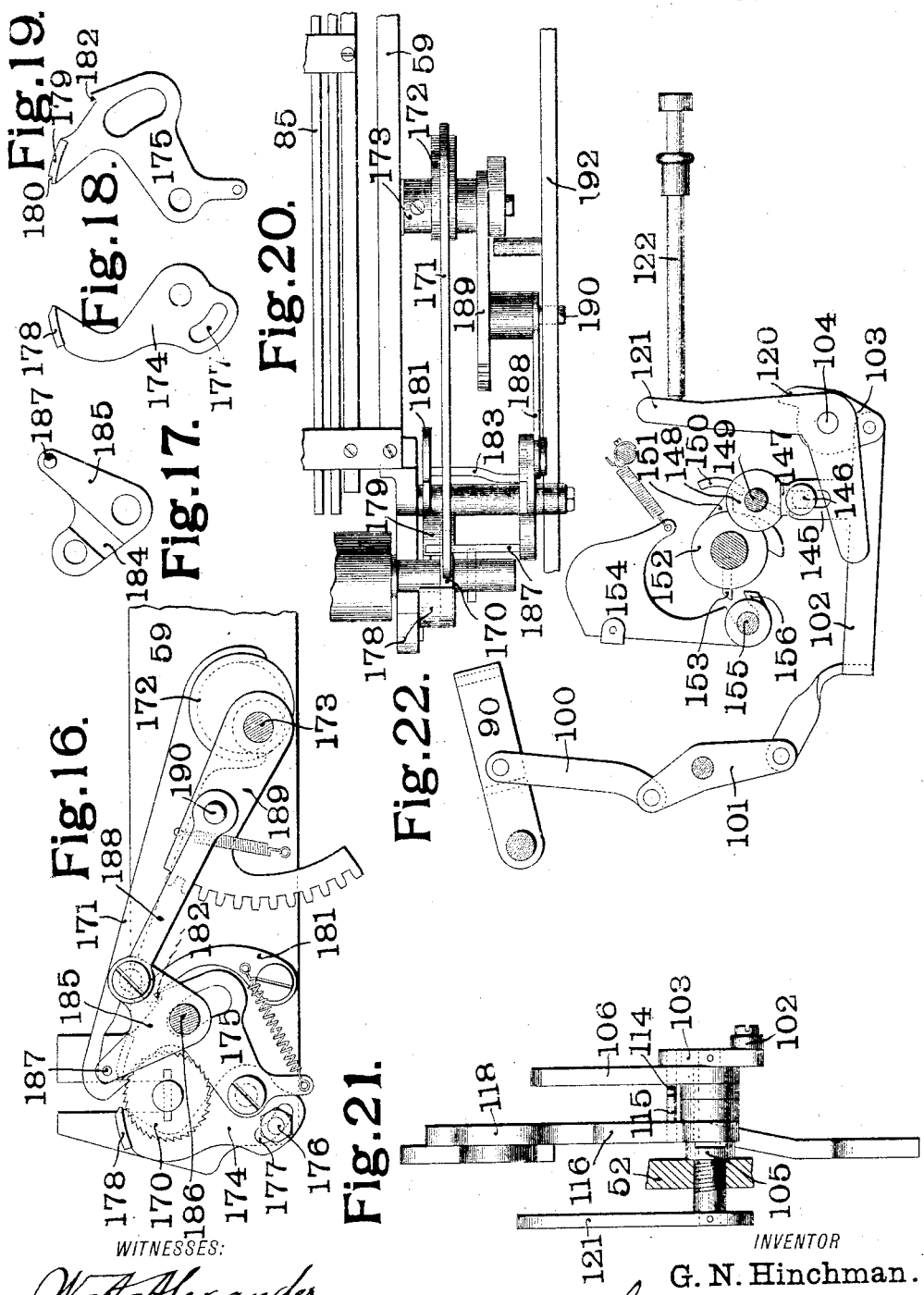

No. 833,389. PATENTED OCT. 16, 1906.
G. N. HINCHMAN.
ADDING MACHINE.
APPLICATION FILED NOV. 13, 1905.
8 SHEETS—SHEET 8.
Fig.23.
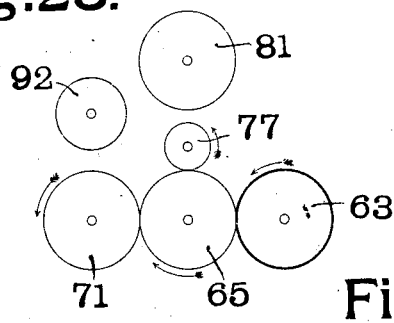
Fig.24.
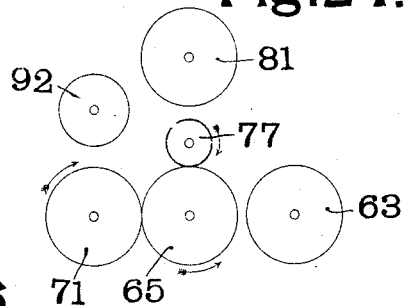
Fig.25.
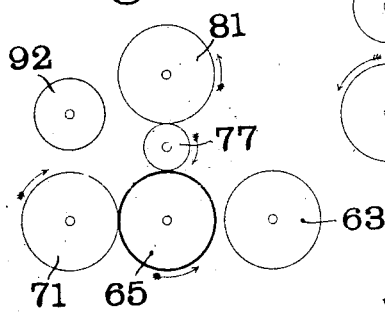
Fig.26.
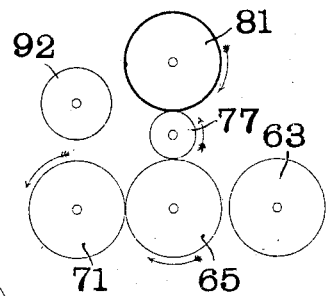
Fig.27.
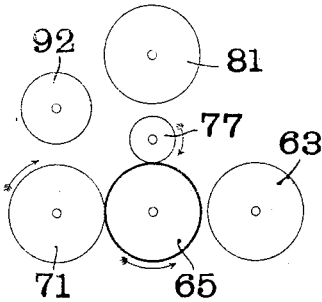
Fig.28. Fig.29. Fig.30.
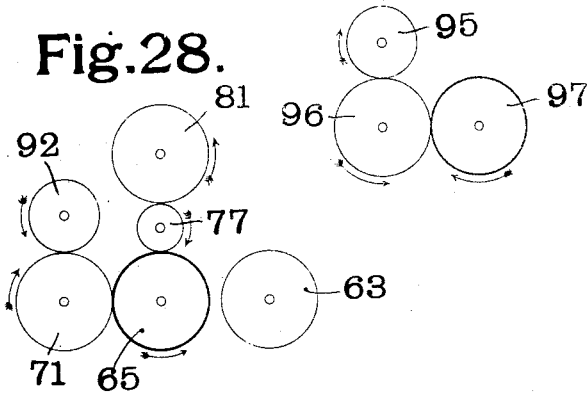
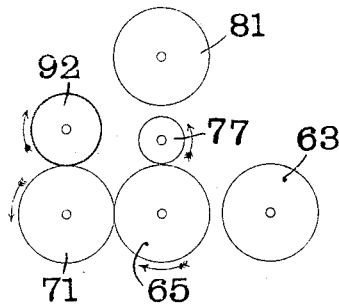
WITNESSES:
W. H. Alexander.
Fred Henke.
INVENTOR
G. N. Hinchman.
BY
Towht H Bryson
ATTORNEYS.

UNITED STATES PATENT OFFICE.

GEORGE N. HINCHMAN, OF WEBSTER GROVES, MISSOURI, ASSIGNOR TO THE STANDARD ADDING MACHINE COMPANY, OF ST. LOUIS, MISSOURI, A CORPORATION OF MISSOURI.

ADDING-MACHINE.

No. 833,389.

Specification of Letters Patent.

Patented Oct. 16, 1906.

Application filed November 13, 1905. Serial No. 287,119.

*To all whom it may concern:*

Be it known that I, GEORGE N. HINCHMAN, a citizen of the United States, residing at Webster Groves, in the county of St. Louis and State of Missouri, have invented a certain new and useful Adding-Machine, of which the following is such a full, clear, and exact description as will enable any one skilled in the art to which it appertains to make and use the same, reference being had to the accompanying drawings, forming part of this specification.

My invention relates to improvements in adding-machines, and more particularly to that class of adding-machines known as the "Standard Adding Machine," and shown and described in the patent to Hopkins, No. 683,939, of October 8, 1901. In the machine shown in the present application, however, the general operation of the machine is somewhat modified from that shown in the Hopkins patent by the interposition of a set of idle wheels between the intermediate wheels and the adding-wheels and the consequent avoidance of the reversal of the type-wheels on taking the total. This feature, however, is not claimed in the present application except in combination, as it forms a part of the subject-matter of another application of even date herewith.

One of the principal objects of my invention is to provide a machine of the class named with a repeat device which can be used not only to repeat the numbers written into the machine, but also to repeat the total when transferred from the adding-wheels to the printing-wheels, and which consequently can be used not only as a repeat device, but also as a subtotal device.

Another object of my invention is to provide the machine with a character which will be printed only when the total is taken.

Still another object of my invention is to provide the machine with improved paper-feeding mechanism.

Other objects of my invention are to provide additional locks for various parts of the machine in order to insure the proper operation of the same.

Figure 2:
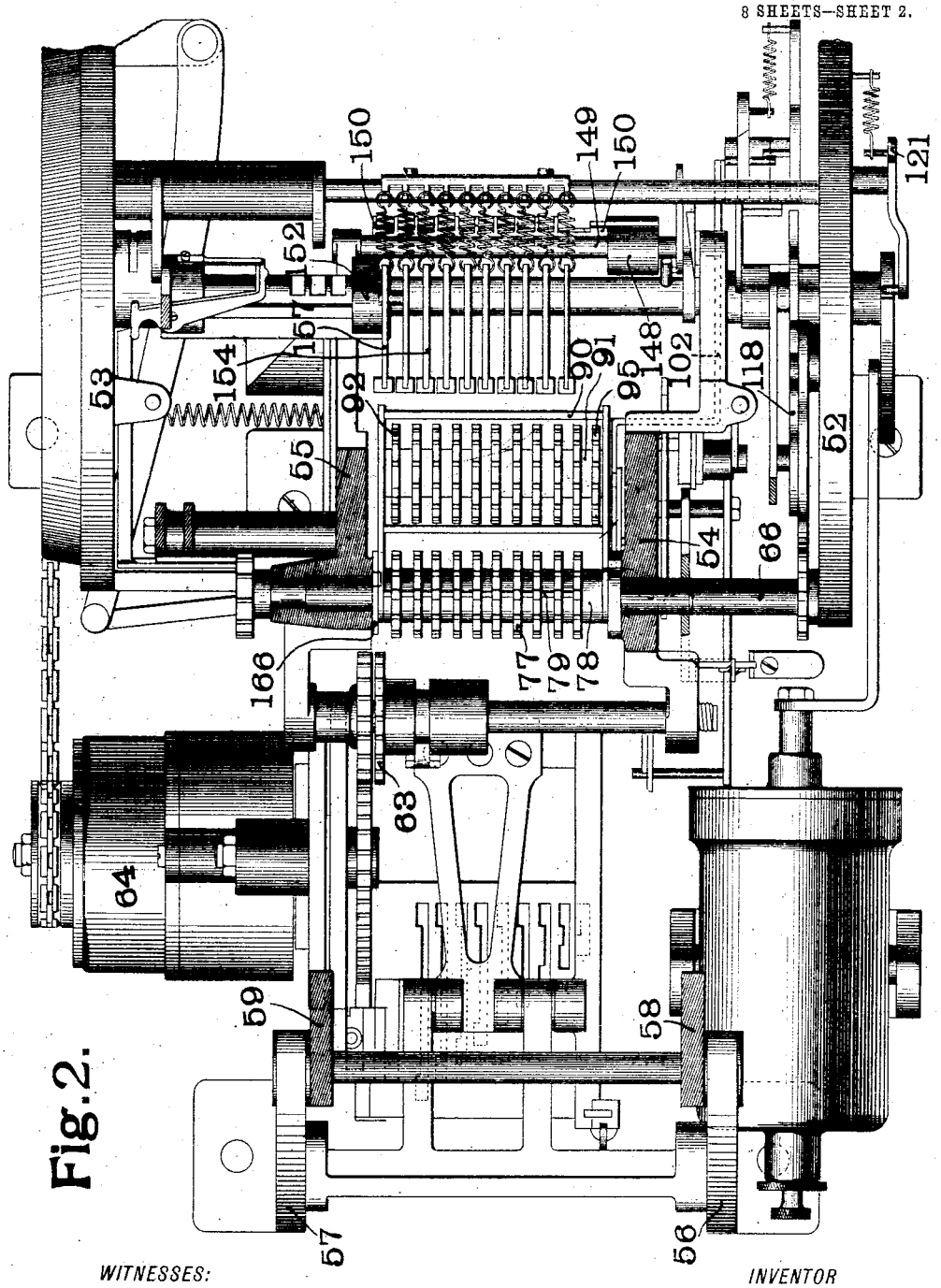
Figure 10:
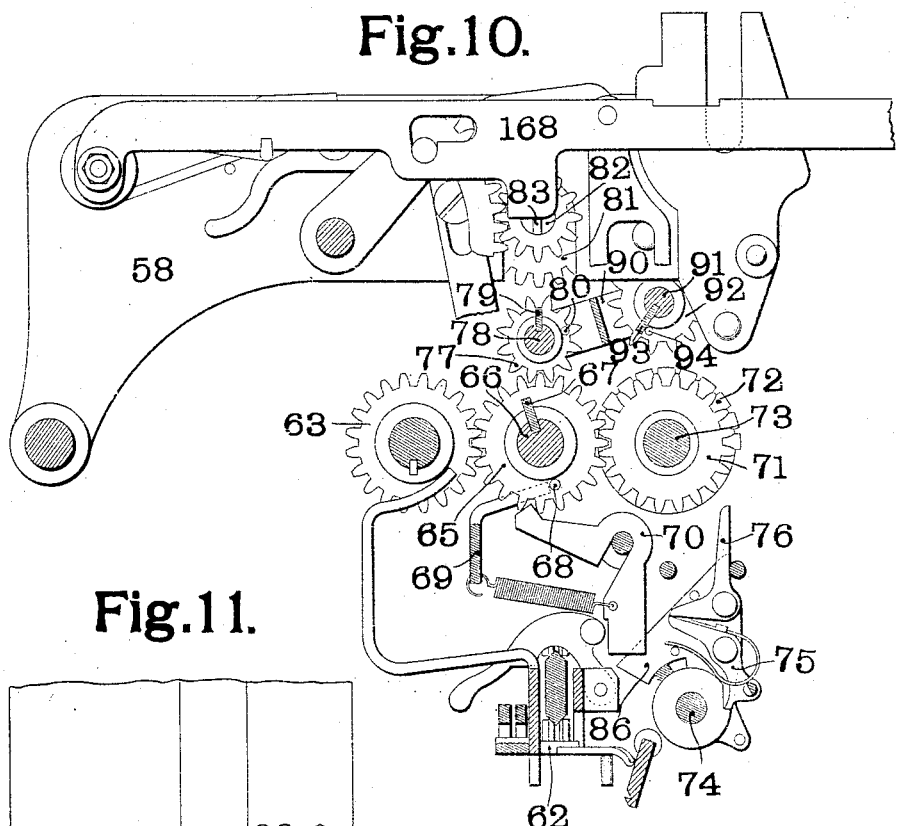
Figure 11:
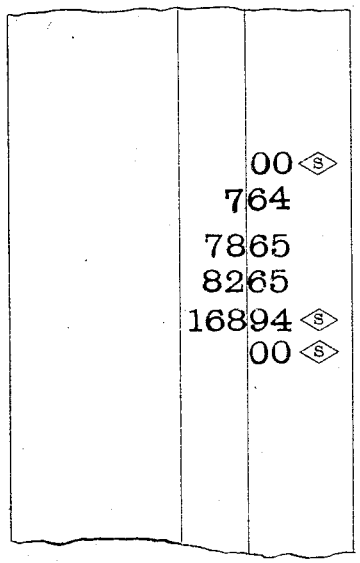
Figure 12:
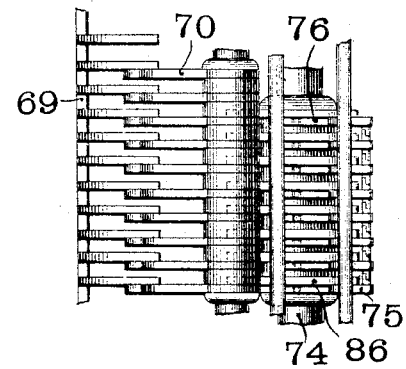
Figure 13:
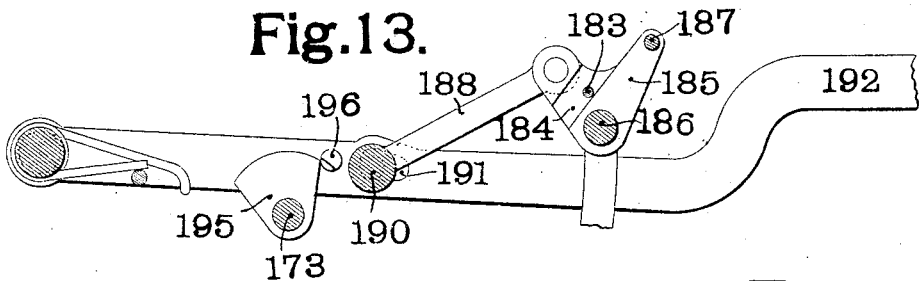
Figure 14:
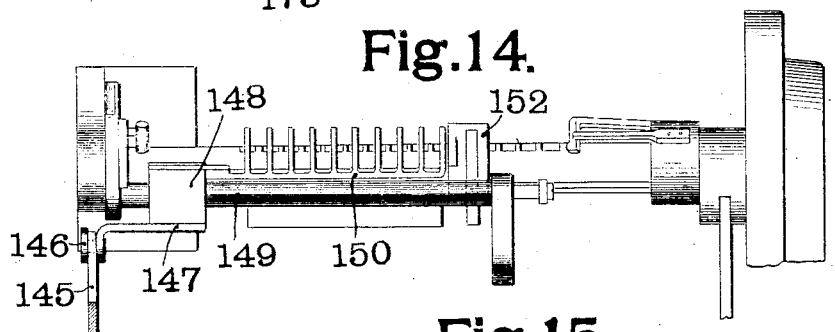
Figure 15:
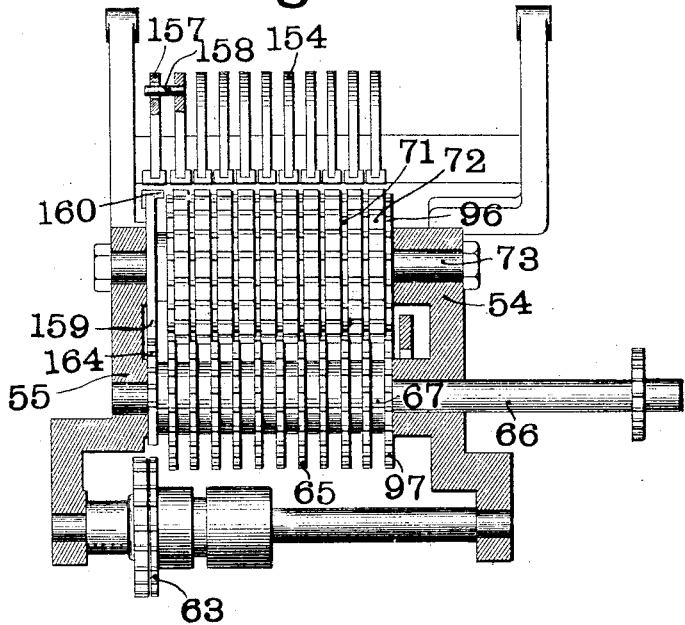

In the accompanying drawings, which illustrate an adding-machine made in accordance with my invention, Figure 1 is a vertical longitudinal section through the front part of the machine. Fig. 2 is a horizontal section through the rear part of the machine. Fig. 3 is a detail view showing a part of the connections for operating the repeat mechanism. Fig. 4 is a view showing the train of gears for positioning the total-sign. Fig. 5 is a detail view showing a lock for the error-key. Fig. 6 is a side elevation showing the mechanism for controlling the repeat device. Figs. 7 and 8 are enlarged detail views of parts of the mechanism for controlling the repeat device. Fig. 9 is a front view of the parts shown in Fig. 6, the frame being shown in section. Fig. 10 is partly a side view and partly a section of the upper and central portions of the machine. Fig. 11 is a view illustrating work done by the machine. Fig. 12 is a sectional view showing the mechanism for printing one or more zeros before the total-sign. Fig. 13 is a detail view of the error-key and lock therefor. Fig. 14 is a view showing mechanism for controlling the printing-slide when repeating. Fig. 15 is a sectional view through the printing and intermediate gears. Fig. 16 is a side elevation showing the paper-feeding mechanism. Figs. 17, 18, and 19 are detail views of portions of the paper-feeding mechanism. Fig. 20 is a top view of the parts shown in Fig. 16. Figs. 21 and 22 are detail views of portions of the controlling mechanism for the repeat device, and Figs. 23 to 30 are diagrammatic views showing the various movements of the adding, printing, intermediate, and idle gears, together with the repeat-gears and the axially-movable wheel.

Like marks of reference refer to similar parts in the several views of the drawings.

The general operation of the machine will first be briefly described. As has been above stated, however, its general operation relates more particularly to the subject-matter of a separate application.

50 is the base of the machine, and 51 the casing. Carried by the base 50 are side frames 52 and 53, intermediate frames 54 and 55, and rear frames 56 and 57. Carried by 55, and the intermediate frames 54 and 55 and the rear frames 56 and 57 are frames 58 and 59, which support the adding-wheels and carrying mechanism.

60 represents the order-keys, and 61 the numeral-keys. These keys control the carriage and printing wheels in the usual manner. As the connections through which these operations are performed do not form a part of the present invention, the same will not be described.

62 is the carriage which controls the axially-movable wheel 63, which transmits the power from the motor 64 to the intermediate wheels 65. The intermediate wheels 65 are mounted upon a shaft 66, carrying a comb 67. The comb 67 is rotated by the operation of the handle and is adapted to come in contact with pins 68 on the said intermediate wheels 65.

69 is a stop for the pin 68.

Each of the wheels 65 is provided with a centering-pawl 70, which serves to center the type. The intermediate wheels 65 mesh with wheels 71, secured to type-wheels 72. The wheels 71 and 72 are loosely mounted on a shaft 73.

The carriage 62 is positioned when the total is taken by means of order stop-pawls 86, mounted upon a shaft 74 and provided with dogs 75 and 76, the dogs 76 being adapted to be thrown into engagement with the teeth of the wheel 71.

Meshing with each of the intermediate wheels 65 is an idle wheel 77. The idle wheels 77 are loosely mounted upon a shaft 78, which shaft is operated by the error-key. The shaft 78 is provided with a comb 79, adapted to engage with pins 80 on the said idle wheels 77.

81 represents the adding-wheels. These wheels are adapted to be thrown into engagement with the idle wheels 77, but are normally out of engagement therewith, as shown in the drawings. The adding-wheels 81 are loosely mounted upon a shaft 82. The shaft 82 is provided with a longitudinally-movable comb 83. This comb 83 is adapted, when moved longitudinally by means of the total-key, to come in contact with lugs 84 on the wheels 81, but is normally out of the path of said lugs.

85 represents the carrying-bars.

The general operation of the parts above described will now be given, as the same is necessary to a proper understanding of my invention. When a number is written into the machine, the parts are in the position shown diagrammatically in Fig. 23. The axially-movable wheel 63 is operated by the motor and drives the intermediate gears 65, printing-wheels 71, and idle wheels 77 in the direction indicated by the arrows in said figure. The adding-wheels 81, however, are out of mesh with the idle wheels 77, and consequently are not actuated. If it is now desired to remove the number from the machine on account of its being erroneous, the error-key is depressed, thus driving the idle wheels 77 in the direction indicated by the arrow in Fig. 24, thus returning the intermediate wheels 65 and printing-wheels 71 to their normal position. In case, however, it is desired to continue the operation and print the number and transfer it to the adding-wheels the handle is drawn forward. This throws the adding-wheels 81 into engagement with the intermediate wheels 77, as shown in Fig. 25, and also rotates the intermediate gears 65 in the direction indicated by the arrow in said figure, thus returning the printing-wheels 71 and idle wheels 77 to their normal position, and transferring the number into the adding-wheels 81. After the numbers have been written into the machine and it is desired to take the total the total-key is depressed. This also throws the adding-wheels 81 into engagement with the idle wheels 77. In this case, however, the adding-wheels 81 are themselves rotated in the direction indicated by the arrow in Fig. 26, thus transferring the sum through the idle wheels 77 and intermediate wheels 65 to the printing-wheels 71, so that the sum may be printed. In case the subtotal device is used when the intermediate wheels 65 are rotated to return the parts to their normal position the adding-wheels 81 will remain in mesh with the idle wheels 77 and the parts will be operated in the same manner as illustrated in Fig. 25, heretofore described. If, however, the subtotal device is not used, the adding-wheels 81 will remain out of mesh with the idle wheels 77, so that the operation of the parts will be the same as that indicated in Fig. 27, and the machine will be returned to zero.

I will now particularly describe the parts directly relating to my invention.

Loosely mounted upon the shaft 78 of the idle wheels 77 is a frame 90. Loosely journaled in this frame 90 is a shaft 91, upon which are loosely mounted the repeat-wheels 92. Secured in this shaft 91 is a comb 93, adapted to come in contact with pins 94 on the wheels 92. The frame 90 normally stands in the position best shown in Fig. 1, so that the wheels 92 are out of mesh with the printing-wheel gears 71; but said frame is adapted to be moved by mechanisms hereinafter to be described, so as to throw the said wheels 92 into engagement with the wheels 71. When the frame is in the position shown in Fig. 1, the wheels 92 are prevented from rotating by a blade 87, carried by a brace-rod 88, extending between the side frames 55 and 56. In order to actuate the shaft 91, the same has rigidly secured to it at its left-hand end a wheel 95, similar to the wheels 92. This wheel 95 is adapted to be thrown into engagement with a wheel 96, loosely mounted on the left-hand end of the shaft 73, upon which the printing-wheels are mounted. This wheel 96 in turn meshes with a wheel 97, rigidly secured to the left-hand end of the shaft 66, upon which the intermediate gears 65 are mounted. It will thus be evident that whenever the frame 90 is moved to bring the wheels 92 into mesh with the printing-wheels 71 and the shaft 66 is rotated the shaft 91, upon which the wheels 92 are mounted, will also be rotated. In order to move the frame 90 to bring the wheels 92 into engagement with the wheels 71, the said frame has pivoted to it a link 100. This link 100 is in turn pivoted to one end of a lever 101, the opposite end of which is pivoted to a bent link 102. The link 102 is in turn pivoted to an arm 103, which is rigidly secured to the end of a rock-shaft 104, supported in a sleeve 105, carried in the side frame 52. Loosely mounted upon the sleeve 105 is an arm 106, having its upper end beveled at 107. This beveled end 107 is adapted to strike against the conical end of a pin 108, carried in a lever 109, which lever 109 is pivoted at 110 to the side frame 52. The lower end of this lever 110 bears upon a link-bar 111, operating a comb 112 to lock the order-keys 60 and numeral-keys 61. Projecting from the arm 106 is a pin 114, which coöperates with a pin 115 on an arm 116, also loosely mounted upon the sleeve 105. The arm 116 is in the form of a bell-crank lever, one portion of the said arm being in the path of a projection 117 upon the plate 118 for operating the intermediate wheels and the other portion of said arm being attached by a spring 119 to the arm 106. When the rock-shaft 104 is operated, it moves the arm 103, which is rigidly secured to it. A finger 120 on said arm comes in contact with the pin 114, which projects at both sides of the arm 106, and thus moves the said arm, so as to bring its beveled upper end into contact with the pin 108, and thus lock the order and numeral keys. The friction between the arm 106 and the pin 108 will hold the parts in this locked position until the same is released by the operation of the plate 118. When the plate 118 is operated, its projection 117 will come in contact with the arm 116 and through the spring 119 will withdraw the arm 106 out of engagement with the pin. In case, however, the rock-shaft 104 is held in position, this movement will only distend the spring 119 without releasing the lock. In Figs. 2, 21, and 22 I have shown the outer end of the rock-shaft 104 provided with an arm 121, arranged in the path of the repeat-key 122. In this construction the repeat-key 122 must be pressed in and held in manually until the number in the machine is repeated the proper number of times. Inasmuch, however, as the operator is liable to prematurely release the key 122, I prefer to use the construction shown in Figs. 6, 7, and 9.

In the construction shown in Figs. 6, 7, and 9 the arm 121 is replaced by a triple arm 123. This arm 123 has an upward extension 124, coöperating with the repeat-key 122, a rearward extension 125, and a downward extension 126. The rearward extension 125 is adapted to coöperate with a locking-sector 127 upon the main or handle shaft 128. This sector 127 is so arranged that when the handle-shaft 128 is moved from its normal position the said sector will pass directly below the end of the arm 125, and thus prevent the repeat-key 122 from being operated until the handle has returned to its normal position, and the end of the lever 125 is also so arranged that when the triple lever 123 is moved the said end will move adjacent to a curved locking-surface 129 on the said sector 127, and thus prevent the handle from being moved until the repeat-key 122, and consequently the lever 123, returns to their normal position. The downward extension 126 is provided with a pawl 130, which engages with the segmental rack 131 to compel the complete movement of the arm 123 in either direction. The arm 123, in place of being rigidly secured to the shaft 104, as is the case with the arm 121, is loosely mounted upon said shaft. In order to operate the shaft from the arm 123, the downward projection 126 of said arm is provided with a pin 132, adapted to contact with a finger 133 on an arm 134, rigidly secured to the shaft 104. This arm 134 is provided with a tooth 135, adapted to be engaged by a pawl 136. Loosely mounted upon the shaft 104 adjacent to the arm 134 is a ratchet-wheel 137, and secured to this ratchet wheel is a second ratchet-wheel 138. The ratchet-wheel 137 is provided with only one-half as many teeth as the ratchet-wheel 138, the portions of the wheel between the teeth on the wheel 137 forming bearing-surfaces 139. The teeth in the wheel 137 are adapted to be engaged by the pawl 136, said pawl being made of sufficient width to engage both with the teeth of the wheel 137 and with the tooth on the arm 134. A second pawl 140 is provided to engage with the teeth of the wheel 138. The teeth of this wheel 138 are also engaged by a pawl 141, carried by the upward extension 124 of the triple arm 123. With this construction it will be evident that when the parts are in their normal position, if the repeat-key 122 is forced in, the triple arm 123 will be operated, thus preventing movement of the handle-shaft 128. At the same time the pawl 141 on the said triple arm will operate the ratchet-wheel 138, moving the same a distance of one tooth, and at the same time it will operate the arm 134 by means of the pin 132 engaging with the finger 133 on said arm. The parts will thus be brought into such position that the pawl 140 will drop into the next tooth of the wheel 138, and the pawl 136 will engage with one of the teeth on the wheel 137 and with the tooth 135 on the arm 134. The arm 134 will thus be locked in its forward position by the pawl 136, and consequently the shaft 104 will be locked in its position, so as to hold the repeat-gears in mesh with the adding-wheel gears 71 and also to hold the arm 106 in engagement with the pin 108, and thus lock the order and numeral keys. When the repeat-key is released, the parts remain in their locked position, as no movement takes place except in the triple lever 123, which returns to its normal position, so as to allow the handle to be moved. The number may now be repeated the desired number of times. When it is desired to release the repeat mechanism, the repeat-key 122 is again forced in. Upon this second movement of the repeat-key the arm 123 is again moved, and through the pawl 141 the wheels 138 and 137 are again moved. By this movement, however, the wheel 137 is brought into such position that the dog 136 in place of engaging with one of the teeth upon the said wheel 137 rests upon one of the bearing-surfaces 139 and is thus held out of engagement with the tooth 135 on the lever 134, so that the parts return to their normal position and the repeat-key is thrown out of operation. It is to be noted, however, that the locking-arm 106 remains in its locked position by friction, as has been previously described, so that the order and numeral keys 60 and 61 are not released until the pull of the handle. Upon the pull of the handle, however, the projection 117 on the plate 118 strikes the arm 116 and through the tension of the spring 119 withdraws the arm 106.

In order to lock the hammers in printing position when repeating a number, the link 102 is provided with an upwardly-projecting bifurcated portion 145. This portion 145 engages with a stud 146, carried in a plate 147. This plate 147 is secured to the lower side of a collar 148, loosely mounted upon a shaft 149. Carried by the collar 148 is a comb 150. This comb normally stands in the position shown in Fig. 22. The comb 150 is adapted to engage a projection 151 on the printing-hammer slide 152, said slide 152 being provided with a comb 153 in the usual manner for operating the printing-hammers 154. When the comb 150 is thrown forward by the operation of the repeat-key 122, it engages with the said projection 150 and prevents the printing-slide 152 from returning to its normal position until the repeat mechanism is released. In order to allow the rotary return of the printing-hammer slide 152, the lower edges of the notches in the printing-hammers which take over the printing-hammer shaft 155 are cut away, as shown at 156 in Fig. 22, so that when the said slide makes its rotary return the lower ends of the hammers will be simply forced slightly forward and snapped back into position by the hammer-springs, while upon the downward movement of the comb 153 the hammers will be operated in the usual manner.

It will be noted that in addition to the usual printing-hammers 154 I provide at the right hand of the machine an additional printing-hammer 157, as shown in Fig. 15. This hammer 157 is adapted to print the total-sign, as will now be described. The hammer 157 is provided with an opening through which passes a pin 158 in the next adjacent hammer to the left, the opening being made somewhat larger than the pin, so that the hammer 157 can have a slightly greater or less movement than the adjacent hammer.

159 is a plate loosely mounted on the type-wheel shaft 73 and carrying a sign 160, used to indicate the total. This may be of any suitable form; but I prefer to use a lozenge containing the letter "S," as shown in Fig. 11 of the drawings. This plate 159 normally stands in the position shown in Fig. 4, so as to be out of the path of the printing-hammer 157, the object of the pin 158 being to prevent the hammer 157 from driving the paper and ribbon against the part of the plate below the printing-sign 160. A centering-pawl 161 holds the plate 159 in either the position shown in Fig. 4 or in the position to print. In the normal operation of the machine the plate is in the position shown in Fig. 4, the pawl 161 resting in a notch 162, while when in the printing position the pawl 161 rests in a notch 163. The rear of the plate 159 is provided with a notch which is engaged by a tooth on a sector 164, loosely mounted upon the intermediate shaft 66. This sector is provided with a pin 165, adapted to be thrown against the stop 69, hereinbefore described. The sector 164 also engages with a sector 166, loosely mounted upon the idle-wheel shaft 78. The sector 166 has an upwardly-projecting tooth 167, adapted to be engaged by the comb 83 of the adding-wheel shaft 82. As the shaft 82 is rotated by the total-key 168, whenever the said key is operated the comb 83 will come in contact with the tooth 167 and through the sectors 166 and 164 move the plate 159, so as to bring the printing-sign 166 in position to be struck by the hammer 157 to print the sign, as shown in Fig. 11. Upon the pull of the handle to return the parts to normal position the comb 67 of the intermediate shaft 66 will engage with the pin 165 and return the parts to the position shown in Fig. 4, so that in the ordinary operation of the machine the sign will not be printed. In connection with the sign I prefer to print before the same one or more zeros when the total-key is depressed and the machine is clear. In Fig. 11 I have shown this in the preferred form, in which two zeros are printed before the said sign to show that the machine is clear. In order to accomplish this, the order stop-pawls 86 are two less in number than the orders for which the mechanism is arranged, as shown in Fig. 12, so that when the total-key is depressed the carriage always moves over at least two spaces, even when there is nothing in the machine, thus printing two ciphers and the sign to show that the machine is clear.

In Figs. 16 to 21 I have shown my improved form of paper-feeding mechanism. 170 is the ratchet-wheel controlling the paper-feed. This ratchet-wheel 170 is engaged by a feed-pawl 171, the end of which forms a strap surrounding an eccentric 172, mounted upon a shaft 173, which is operated by the pull of the handle. Pivoted below the ratchet-wheel 170 are two plates 174 and
175. The plate 174 is normally fixed, but can be adjusted by means of a nut 176 on a bolt passing through a slot 177 in the said plate. This plate is provided at its upper end with a flange 178, and the plate 175 is provided with a flange 179, having a shoulder 180. In the normal operation of the machine these plates stand in the position shown in Fig. 16, the flanges 178 and 179 being some distance apart, and this distance regulates the feed and can be adjusted by means of the nut 176. The plate 175 is held in its normal position by means of a hook 181, which engages with a shoulder 182 on the said plate. The hook 181 is provided with a pin 183, which engages with a slot 184 in a bell-crank lever 185, loosely mounted on a stud 186. The bell-crank lever 185 is provided with a pin 187, which projects below the feed-pawl 171. The bell-crank lever is connected by a link 188 with a toothed sector 189, loosely mounted upon the shaft 173, hereinbefore described. The pivot connecting the link 188 with the sector 189 is extended to form a stud 190, which passes through a slot 191 in the error-key bar 192, so that the said sector is operated each time the error-key bar is depressed. When the error-key bar is depressed, the movement of the bell-crank lever 185 raises the feed-pawl 171 out of engagement with the ratchet-wheel 170, and at the same time the engagement of the lower edge of the slot 184 with the pin 183 moves the hook 181 out of engagement with the shoulder 182, so that a spring 193 moves the plate 175 on its pivot, and thus brings the flanges 178 and 179 into contact, so that upon the next movement of the handle the feed-pawl 171 cannot fall into engagement with the ratchet-wheel 170, but engages with the shoulder 180 in the flange 179, and thus draws the plate 175 back into normal position, in which it is held by the hook 181, so that upon the succeeding movement of the handle the paper is fed in the normal manner.

In order to prevent the depression of the error-key when the handle is out of its normal position and to also prevent the movement of the handle when the error-key is out of its normal position, the shaft 173, which is operated by the handle, is provided with a sector 195, and the error-key bar 192 is provided with a pin 196, these parts being arranged as best shown in Fig. 7. It will be evident that whenever the shaft 73 is moved by the operation of the handle the sector 195 will move below the pin 196, and thus effectually prevent the depression of the error-key bar, and that when the error-key bar is depressed the movement of the pin 196 behind the sector will prevent the movement of the handle. In Fig. 5 I have also shown an additional lock for the error-key bar. 197 is an arm loosely mounted on the handle-shaft 128 and operated by the depression of the error-key. This arm is adapted to be engaged by the overturned end 198 of a bell-crank lever 199. The opposite end of this bell-crank lever 199 is bifurcated and engages with a pin 200 upon a cradle 201, which is operated by the depression of the order-keys 60. In consequence of this construction whenever one of the order-keys 60 is depressed to swing the cradle 201 upon the shaft 128 the bell-crank lever 199 is rocked, so as to move its overturned end 198 over the arm 197, and thus prevent the depression of the error-key.

I will now particularly describe the complete operation of the machine in so far as the same is affected by my improvements.

The number is written into the machine by manipulating the order and numeral keys 60 and 61 in the usual manner. Now if it is desired to repeat the number before operating the handle the repeat-key 122 is forced inwardly. The action of the key 122 swings the triple arm 123 on its pivot, thus bringing its rear extension 125 in the path of the sector 127, so that the handle cannot be operated. This movement of the lever 123 also is communicated through the pawl 141 to the ratchet-wheel 138. As the wheels 137 and 138 are rigidly secured together the wheel 137 will also be rotated. The pin 132 in the arm 126 will come in contact with the finger 133, and thus move the lever 134, which is rigidly secured to the shaft 104. The shaft 104 will thus be operated to move the arm 103 and at the same time will be locked in this position by the engagement of the pawl 136 with the tooth 135 on the arm 134. When the repeat-key 122 has completed its movement, the pawl 130 and segmental rack 131 will allow its return to normal position, so that the handle may be operated. The movement of the arm 103 will be communicated through the link 102, lever 101, and link 100 to the frame 90, so that the said frame will be drawn down to bring the repeat-wheels 92 into engagement with the type-gears 71. At the same time the link 102, through its upward bifurcated portion 145, will rock the sleeve 148 on its shaft 149, so as to bring the comb 150 into engagement with the projection 151 on the printing-slide 152, and thus lock the said printing-slide in position. The handle can now be drawn forward as many times as required to repeat the number. When the handle is drawn forward, the printing will take place in the usual manner, after which the type-wheels, idle wheels, and intermediate wheels will be returned to normal position by the action of the comb 67 of the intermediate wheels upon the pin 68 of said wheels. As the shaft 66 has rigidly secured to it the gear 97, the movement of the said shaft will be communicated through the said gear and the gears 96 and 95 to the shaft 91 of the repeat-wheels. The comb 93 in said shaft will thus be moved away from the pins 94 and at the same time as the wheels 92 are in engagement with the type-gears 71 the wheels 92, corresponding to any of the type-wheels which have been operated in printing the number, will be moved, so that the pins in said wheels will follow the comb 93 one or more teeth, according to the number written in on the type-wheel. Upon the return of the shaft 66 to its normal position the shaft 91 will again be rotated by means of the train of gears 95, 96, and 97 and be returned to its normal position, the comb 93 striking the pins 94 of any wheels which have been moved, and thus again setting up the number in the printing-wheels. This operation will be repeated as many times as the handle is drawn forward. When the handle has been drawn forward as many times as desired, less one, the error-key is again forced in. This second movement of the repeat-key moves the wheel 138 a second notch, thus bringing one of the bearing-faces 139 of the wheel 137 into engagement with the pawl 136, and so holding the pawl out of engagement with the tooth 135 on the arm 134, so that upon the release of the repeat-key the said arm 134 can swing back into normal position, thus releasing the repeat mechanism and allowing the wheels 92 to move out of engagement with the wheels 71. The handle can now be drawn forward another time to complete the desired number of repeats. One advantage of my construction, however, is that in case the operator should pull the handle as many times as required before releasing the repeat mechanism the last repeat set up in the machine can be thrown out by means of the error-key 192, as there is nothing in the repeat mechanism to prevent the ordinary operation of the error-key. The total is taken on the machine in the usual manner by depressing the total-key 168. It will be evident that the repeat mechanism above described can be used in repeating the total thus obtained, as the parts after depressing the total-key are in the same position as if the number had been written into the machine by means of the keys. It is therefore only necessary after depressing the total-key to operate the repeat-key and the total can be repeated as many times as desired. This operation is useful in various ways. One advantage of thus being able to repeat the total is that the repeat-key may be used in place of a subtotal-key. After taking the total the repeat-key is operated, and after one pull of the handle to write the sum the repeat-key is again released. The sum can then be written at the head of the next column by again pulling the handle, and the said sum will be returned into the adding-wheels, so that the repeat-key serves every purpose of a subtotal device.

The device for writing the sign after the sum is readily understood and has been clearly described above. The operation of the total-key rotates the shaft 82, carrying the comb 83, and the movement of said comb is communicated through the train of gears 166 and 164 to the plate 159, carrying the printing-sign 160, so as to throw said sign into position to print, and thus indicate that the total has been taken. This is especially useful in long calculations where the subtotal is taken a number of times, as the totals can thus be readily distinguished from the individual numbers. It is also useful in connection with the two ciphers, as shown in Fig. 11, to indicate that the machine is clear before and after doing a sum in addition.

Having fully described my invention, what I claim as new, and desire to secure by Letters Patent of the United States, is—

1. In an adding-machine, the combination with adding devices, of item-recording devices, keys for controlling said item-recording devices to record a number, and a repeat device coöperating with said item-recording devices.

2. In an adding-machine, the combination with adding-wheels, of item-recording wheels, keys for controlling said item-recording wheels to record a number, and a repeat device coöperating with said item-recording wheels.

3. In an adding-machine, the combination with adding-wheels, of item-wheels, keys for controlling said item-wheels, and repeat-wheels coöperating with said item-wheels.

4. In an adding-machine, the combination with adding-wheels, of item-wheels, and repeat-wheels coöperating with said item-wheels.

5. In an adding-machine, the combination with adding devices, of item-recording devices, numeral-keys, a translating device successively connecting said numeral-keys with the item-recording devices of different orders, and a repeat device coöperating with said item-recording devices.

6. In an adding-machine, the combination with adding-wheels, of item-wheels, numeral-keys, a translating device successively connecting said numeral-keys with said item-wheels, and a repeat device coöperating with said item-wheels.

7. In an adding-machine, the combination with adding-wheels, of item-wheels, numeral-keys, a translating device successively connecting said numeral-keys with the item-wheels of different orders, and repeat-wheels coöperating with said item-wheels.

8. In an adding-machine, the combination with adding devices, of item-recording devices, numeral-keys, a laterally-movable carriage successively connecting said numeral-keys with said item-recording devices, and a repeat device coöperating with said item-recording devices.

9. In an adding-machine, the combination with adding-wheels, of item-wheels, numeral-keys, a laterally-movable carriage successively connecting said numeral-keys with said item-wheels, and a repeat device coöperating with said item-wheels.

10. In an adding-machine, the combination with adding-wheels, of item-wheels, numeral-keys, a laterally-movable carriage successively connecting said numeral-keys with said item-wheels, and repeat-wheels coöperating with said item-wheels.

11. In an adding-machine, the combination with adding-wheels, of item-wheels, a driving-wheel, intermediate wheels between said item-wheel and said driving-wheel, idle wheels between said intermediate wheels and said adding-wheels; and a repeat device coöperating with said item-wheels.

12. In an adding-machine, the combination with adding-wheels, of item-wheels, a driving-wheel, intermediate wheels between said item-wheels and said driving-wheel, idle wheels between said intermediate wheels and said adding-wheels, and repeat-wheels coöperating with said item-wheels.

13. In an adding-machine, the combination with adding-wheels, of item-wheels, and repeat-wheels adapted to be thrown into and out of engagement with said item-wheels.

14. In an adding-machine, the combination with adding-wheels, of item-wheels, pivotally-mounted repeat-wheels, and means for moving the said repeat-wheels into and out of engagement with said item-wheels.

15. In an adding-machine, the combination with adding-wheels, of item-wheels, intermediate wheels engaging said item-wheels, repeat-wheels adapted to be thrown into and out of engagement with said item-wheels, and mechanism for driving said repeat-wheels from said intermediate wheels.

16. In an adding-machine, the combination with adding-wheels, of item-wheels, intermediate wheels meshing with said item-wheels, idle wheels meshing with said intermediate wheels, adding-wheels adapted to be thrown into and out of engagement with said item-wheels, and means for operating said repeat-wheels from said intermediate wheels.

17. In an adding-machine, the combination with adding-wheels, of item-wheels, a driving-wheel, intermediate wheels between said item-wheels and said driving-wheel, idle wheels between said adding-wheels and said intermediate wheels, means for actuating said idle wheels to operate said item and intermediate wheels, and a repeat mechanism coöperating with said item-wheels.

18. In an adding-machine, the combination with adding-wheels, of item-wheels, a driving-wheel, intermediate wheels between said item-wheels and said driving-wheel, idle wheels between said adding-wheels and said intermediate wheels, means for actuating said idle wheels to operate said item and intermediate wheels, and repeat-wheels coöperating with said item-wheels.

19. In an adding-machine, the combination with adding-wheels, of item-wheels, a driving-wheel, intermediate wheels between said item-wheels and said driving-wheel, means for actuating said driving-wheel while said item and intermediate wheels are out of operative connection with said adding-wheels, and repeat device coöperating with said item-wheels.

20. In an adding-machine, the combination with adding-wheels, of item-wheels, a driving-wheel, intermediate wheels between said item-wheels and said driving-wheel, means for actuating said driving-wheel while said item-wheels and intermediate wheels are out of operative connection with said adding-wheels, and repeat-wheels coöperating with said item-wheels.

21. In an adding-machine, the combination with adding-wheels, of item-wheels, a driving-wheel, intermediate wheels between said driving-wheel and item-wheels, means for actuating said driving-wheel while said item and intermediate wheels are out of operative connection with said adding-wheels, means for returning said item-wheels to zero while in operative connection with said adding-wheels, and a repeat device coöperating with said item-wheels.

22. In an adding-machine, the combination with adding-wheels, of item-wheels, a driving-wheel, intermediate wheels between said driving-wheel and item-wheels, means for actuating said driving-wheel while said item and intermediate wheels are out of operative connection with said adding-wheels, means for returning said item-wheels to zero while in operative connection with said adding-wheels, and repeat-wheels coöperating with said item-wheels.

23. In an adding-machine, the combination with adding-wheels, of item-wheels, a driving-wheel, intermediate wheels between said driving-wheel and said item-wheels, means for actuating said driving-wheels while said item and intermediate are out of operative connection with said adding-wheels, means for returning said item-wheels to zero while in operative connection with said adding-wheels, repeat-wheels coöperating with said item-wheels, and a train of gears for operating said repeat-wheels from said intermediate wheels.

24. In an adding-machine, the combination with adding-wheels, of item-wheels, a driving-wheel, intermediate wheels between said driving-wheel and item-wheels, means for returning said item-wheels to zero while out of operative connection with said adding-wheels, means for returning said item-wheels to zero while in operative connection with said adding-wheels, and a repeat device coöperating with said item-wheels.

25. In an adding-machine, the combination with adding-wheels, of item-wheels, a driving-wheel, intermediate wheels between said driving-wheel and item-wheels, means for returning said item-wheels to zero while out of operative connection with said adding-wheels, means for returning said item-wheels to zero while in operative connection with said adding-wheels, and repeat-wheels coöperating with said item-wheels.

26. In an adding-machine, the combination with adding-wheels, of item-wheels, a driving-wheel, intermediate wheels between said driving-wheel and item-wheels, idle wheels between said adding-wheels and said intermediate wheels, means for actuating said item-wheels, means for actuating said idle wheels while out of operative connection with said adding-wheels, and a repeat device coöperating with said item-wheels.

27. In an adding-machine, the combination with adding-wheels, of item-wheels, a driving-wheel, intermediate wheels between said driving-wheel and said item-wheels, idle wheels between said intermediate wheels and said adding-wheels, means for actuating said item-wheels, means for actuating said idle wheels while out of operative connection with said adding-wheels, and repeat-wheels coöperating with said item-wheels.

28. In an adding-machine, the combination with adding-wheels, of item-wheels, a driving-wheel, intermediate wheels between said driving-wheel and said item-wheels, idle wheels between said intermediate wheels and said adding-wheels and normally out of opative connection with the latter, means for operating said idle wheels to return the said item-wheels to zero, and a repeat device coöperating with said item-wheels.

29. In an adding-machine, the combination with adding-wheels, of item-wheels, a driving-wheel, intermediate wheels between said item-wheels and said driving-wheel, idle wheels between said intermediate wheels and said adding-wheels and normally out of operative connection with the latter, means for operating said idle wheels to return said item-wheels to zero, and repeat-wheels coöperating with said item-wheels.

30. In an adding-machine, the combination with adding-wheels, of item-wheels, repeat-wheels, a repeat-key for throwing said repeat-wheels into engagement with said item-wheels, and locking means for retaining said repeat-wheels in engagement with said item-wheels.

31. In an adding-machine, the combination with adding-wheels, of item-wheels, repeat-wheels, a repeat-key for throwing said repeat-wheels into engagement with said item-wheels, means for locking said repeat-wheels in engagement with said item-wheels, and means actuated by a second operation of said repeat-key for releasing said repeat-wheels.

32. In an adding-machine, the combination with adding-wheels, of printing-wheels, printing-hammers for said wheels, a controlling device for said printing-hammers, a repeat device, a repeat-key for operating said device, said repeat-key also governing said printing-hammer-controlling device.

33. In an adding-machine, the combination with adding mechanism, item-recording mechanism, a repeat mechanism for said recording mechanism, and an error-key for removing the last number transferred to said recording mechanism by said repeat mechanism.

34. In an adding-machine, the combination with adding devices, of item-recording mechanism, means for transferring the total from said adding devices to said recording mechanism, and a repeat mechanism for repeating said total.

35. In an adding-machine, the combination with adding devices, of item-recording devices, a repeat device coöperating with said item-recording devices, operating connections for said repeat device, a repeat-key for operating said connections, a wheel provided with teeth and intermediate bearing-faces and also operated by said repeat-key, and a pawl coöperating with said wheel and said connections.

36. In an adding-machine, the combination with adding devices and item-recording devices, of a total-key, means operated by said total-key for printing a zero when said adding device is empty, and a total-sign also operated by said total-key.

37. In an adding-machine, the combination with adding-wheels, of item-wheels, intermediate wheels meshing with said item-wheels, idle wheels meshing with said intermediate wheels, a total-sign alined with said item-wheels, and a train of gears for operating said total-sign from said adding-wheels.

38. In an adding-machine, the combination with adding and item-recording devices, of a paper-feed device provided with a ratchet-wheel, a feed-pawl coöperating with said ratchet-wheel, a shield, an error-key, and connections operated by said error-key for moving said shield between said pawl and said ratchet-wheel.

39. In an adding-machine, the combination with adding and item-recording devices, of a paper-feed device provided with a ratchet-wheel, a feed-pawl coöperating with said ratchet-wheel, a shield, an error-key, connections operated by said error-key for moving said shield between said pawl and ratchet-wheel, and a second adjustable shield coöperating with said first-named shield.

40. In an adding-machine, the combination with adding and item-recording devices, of a main shaft, an auxiliary shaft actuated by said main shaft, a locking device carried by said auxiliary shaft, an error-key, and a projection carried by said error-key and adapted to be moved into the path of the locking device.

41. In an adding-machine, the combination with adding and item-recording devices, of a main shaft, an auxiliary shaft actuated by said main shaft, a locking device carried by said auxiliary shaft, an error-key, a projection carried by said error-key, and means for operating said main shaft to move said locking device into the path of said projection.

In testimony whereof I have hereunto set my hand and affixed my seal in the presence of the two subscribing witnesses.

GEORGE N. HINCHMAN. [L. S.]

Witnesses:
  W. A. ALEXANDER,
  BENNETTE PIKE.